Aug. 14, 1962 E. K. PROCTOR, JR 3,049,679

MICROWAVE POWER MULTIPLIER

Filed Feb. 18, 1960 2 Sheets-Sheet 1

INVENTOR:
EDWARD K. PROCTOR JR.,
BY Michael Masnik
HIS ATTORNEY.

INVENTOR:
EDWARD K. PROCTOR JR.,
BY Michael Masnik
HIS ATTORNEY.

United States Patent Office 3,049,679

Patented Aug. 14, 1962

3,049,679

MICROWAVE POWER MULTIPLIER

Edward K. Proctor, Jr., Menlo Park, Calif., assignor to General Electric Company, a corporation of New York Filed Feb. 18, 1960, Ser. No. 9,602

3 Claims. (Cl. 333—13)

This invention relates to a microwave power multiplier and more particularly is concerned with apparatus for coupling electromagnetic waves at high powers to a load circuit using a low power source of electromagnetic waves.

The operation of many electrical devices makes use of electrical pulses of given length. Significant improvements in the accuracy and operation of such equipment can oftentimes be achieved by a reduction of the pulse length. Pulse lengths as short as 1/10 microsecond at power levels up to a few hundred kilowatts are considered conventional by present day standards. At X band frequency pulse lengths of .02 to .03 microsecond have been achieved with special modulators for magnetron transmitters. Pulse lengths of .01 microsecond have been achieved at K band and higher. However, these short pulse lengths are achieved with great difficulty using magnetrons and in general the shorter the pulse length required, the higher must the frequency be. At these higher frequencies, less peak power is available in general. Oftentimes, however, it is desirable to be able to generate millimicrosecond pulses at C, S and L bands. Klystron and traveling wave amplifiers can be made to generate short pulses, but with considerable difficulty because of reduced efficiency and severe modulator problems, and they are not too often used in this manner.

It is therefore an object of this invention to provide a source of electromagnetic waves in the ranges of pulse lengths, frequencies and power levels at which other types of sources operate poorly or not at all.

It is further an object of this invention to provide an improved source of relatively short pulses of high power.

It is a further object of this invention to provide a more simple, efficient, reliable and lighter weight source of high powered pulses than has heretofore been possible.

It is a further object of this invention to provide an improved signal processing arrangement.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Briefly, in accordance with one embodiment of the invention, there is provided a waveguide directional coupler having four waveguide terminals. A source of electromagnetic waves is coupled to one of said waveguide terminals. Waveguide means are provided for coupling two other of said terminals, said two other terminals also being electrically coupled to each other by said directional coupler, whereby a closed loop energy path is provided by said coupler and said waveguide means. The closed loop path is made an integral number of waveguide wavelengths long at the frequency of said source, whereby waves coupled into the loop propagate around said loop as traveling waves. The transmission coefficient of the loop and the coupling coefficient of the directional coupler are proportioned such that the power level of waves propagating in said loop is greater than the power level of said source. Means are provided for coupling waves from said loop to said load circuit. Said means is made responsive to a predetermined greater power level of waves in said loop for coupling said waves to said load circuit.

Figure 1:
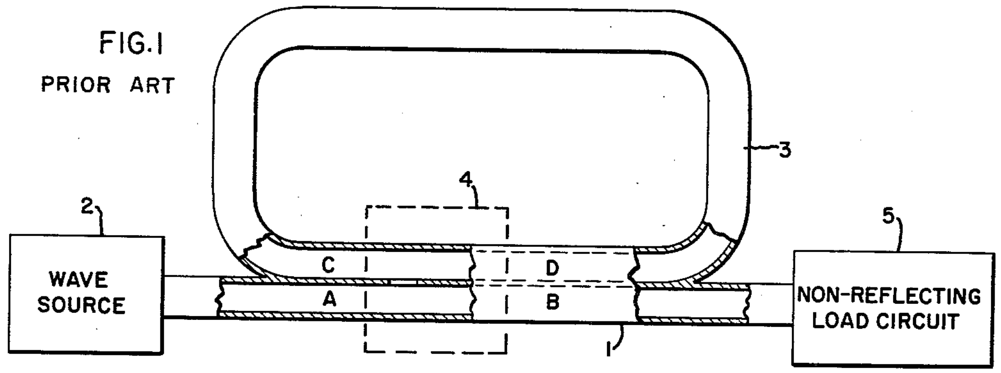
FIG. 1 illustrates a prior art waveguide arrangement.

Referring to FIG. 1 there is shown a primary waveguide 1 for coupling waves from a source 2 to a secondary waveguide 3 through a sidewall directional coupler or other directional coupling device 4 having the property that the coupled wave is shifted in phase by 90° relative to the primary wave. The primary waveguide 1 is terminated in a non-reflecting load 5 and has wave energy of given field strength supplied to its input. The secondary waveguide 3 is closed upon itself as shown. The directivity of the coupler is selected to be such that the coupled wave appears in arm D of the four-arm junction defined by coupler 4 and guides 1 and 3. The sidewall coupler 4 has the property that the coupled wave in arm D differs in phase by 90° from the direct wave in arm B irrespective of the value of the coupling coefficient of coupler 4.

The coupled wave will proceed around waveguide 3 to arm C. A portion of this wave will proceed to arm D and a (smaller) portion will be coupled back into the primary line, with a 90° phase shift, into arm B. The length of the waveguide 3 is adjusted such that the portion of this recirculated wave in arm D is in phase addition at the operating frequency with the wave energy then entering arm D from arm A. The wave energy entering arm B from arm C is then in phase opposition to the wave energy entering arm D from the input. This follows from the fact that the former has passed twice through the coupler to acquire a total phase shift of $180°+n360°$ where $n$ is an integer equal to the length of waveguide 3 measured in wavelengths. Under these phase conditions, energy in arm D will increase and that in arm B will decrease. This cycle of events is progressive. The energy level in arm C continues to increase, and the portion coupled into arm B progressively cancels larger amounts of the wave entering arm B from arm A. Eventually, the former equals and then exceeds the latter, the crossover producing a phase reversal of the wave in arm B. In the ideal lossless case the circuit stabilizes when the energy level in waveguide 3 exceeds that at the input by approximately $(K+6)$ decibels, where K is the coupling coefficient of directional coupler 4 measured in decibels. For example, for $K=14$ db, the ultimate energy level in the secondary arm is 20 db or 100 times greater than that at the input. This relationship is slightly modified by the presence of the inevitable circuit losses, but a considerable build-up of power in the secondary waveguide can be achieved.

Though the power level in the secondary waveguide is enhanced relative to that of the primary waveguide, the energy stored in the secondary is smaller than that supplied to the input during the build-up interval. It is thus appropriate to consider the secondary circuit as an energy storage device, storage being achieved by means of traveling wave energy instead of the more conventional standing wave energy storage of the more familiar resonant cavities. The circuit as described thus far has been discussed in the literature and is presented here by way of introduction for what follows.

In FIG. 1, the total axial length of the secondary waveguide is L and the group velocity for wave propagation is $v_g$. The length of time required for a disturbance to propagate completely around the loop is equal to $$\tau=\frac{L}{v_g}$$

Suppose that the circuit as heretofore described has arrived at a steady state condition with energy circulating in the secondary circuit. If means can be provided whereby an antenna or other desirable load is effectively instantaneously connected to the secondary waveguide in a non-reflective manner, the stored energy will be delivered to this load at an essentially constant rate for a time interval of duration $\tau$. For lengths L of the order of 10 feet, the lengths of the pulses so generated are of the order of ten millimicroseconds. A circuit whereby this result may be accomplished is shown in FIG. 2.

Figure 2:
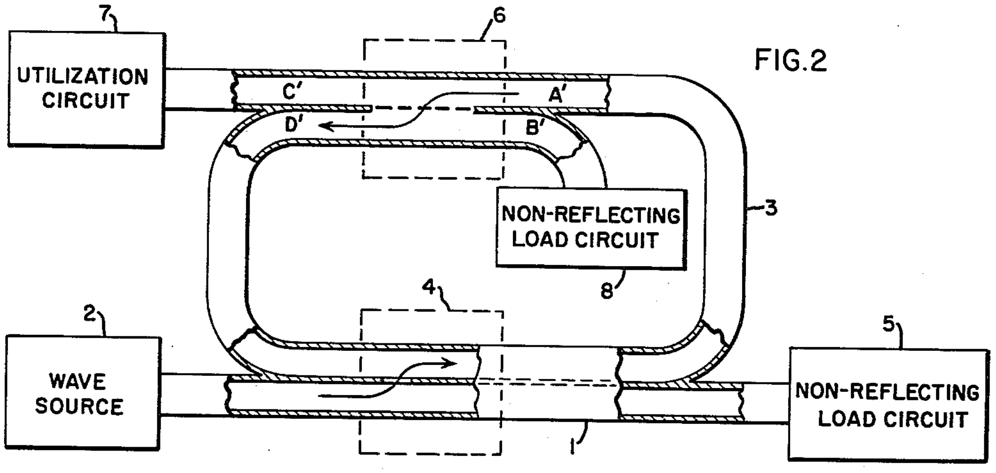
FIG. 2 illustrates an arrangement useful in explaining the present invention.

In FIG. 2 the secondary circuit of FIG. 1 has been modified by the addition of a 100% directional or total coupler 6 as shown, for example, of the long slot type. Assuming that the coupler has high directivity, circulation of the wave energy in the counterclockwise direction in the secondary circuit is the same as described in connection with FIG. 1. A negligible amount of energy is propagated to the load 7 because of the full transfer property of the coupler. If now the coupler is abruptly altered in such a manner that its coupling coefficient is reduced to zero, the energy stored in the secondary circuit will appear as a short pulse in the load 7 as previously described. The desired alteration of coupling characteristic can be achieved in principle by movement of a metal shutter which closes the coupling aperture. Since physical movement of a metal shutter in a time short compared to $10^{-8}$ seconds is difficult to achieve, an improved method of achieving the same effect is to use the coupler mechanism described in FIG. 3.

Figure 3:
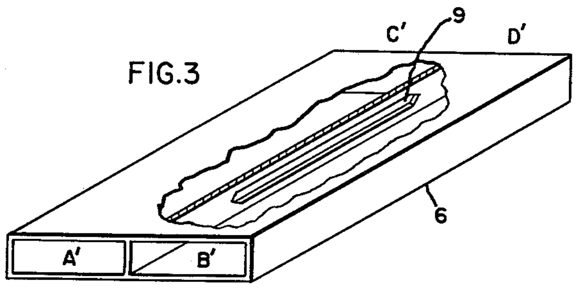
FIGS. 3, 4 and 5 illustrate arrangements for coupling high powered pulses to the desired load circuit.

In FIG. 3 there is shown a pair of rectangular guides having a long slot 9 in the common narrow wall. Such a slot can be designed to approach a 100% coupling coefficient and high directivity. As for any reciprocal 100% coupler, all energy entering arm A′ is transmitted to arm D′ with the same property holding for arms B′—C′, D′—A′ and C′—B′. Of importance for the present application is the behavior of the electric field gradient across the width of the coupling slot. The electric field across the slot can become quite large. This fact, plus the relatively narrow slot width, leads to an electric field gradient across the slot which is large compared to any other electric field gradient within the coupler or its adjoining waveguide. Hence, a power level sufficient to produce an electrical discharge or arc across the slot can be attained without exceeding the power handling capacity of the remainder of the circuit. Because the electric field gradient is nearly independent of distance along the slot, the entire gap will break down within a very short interval of time. Such an electrical discharge is a highly ionized medium and acts as an excellent conductor for microwave frequencies. Thus, the effect of the electrical discharge across the coupling slot is to reduce the coupling coefficient effectively to zero. In this case, energy formerly entering arm A′ and being transmitted to arm D′ is transmitted to arm C′ instead.

Referring to FIG. 2 the directional coupler shown in FIG. 3 is placed in the circuit with arms A′, B′, C′ and D′ disposed as shown. For purposes of explanation, let us assume that a pulse of wave energy, for example, one microsecond in duration is applied from source 2 to directional coupler 4. The constants of the circuit are selected such that the secondary wave energy achieves, for example, 90% of its ultimate level within a time interval of slightly less than one microsecond and that the dimensions of the long coupling slot, shown at 5, are such that breakdown occurs at slightly less than 90% of the ultimate power level. Under these conditions an arc will form suddenly across the slot and the energy stored in the secondary waveguide will be dissipated in a short pulse, e.g., .01 microsecond long, in the load 7. Furthermore, the power level of this pulse will be many times greater than the input power level. In other words, the device as described acts to convert a relatively long pulse at a moderate power level into a relatively short pulse at a very high power level. The arrangement as disclosed can be made to operate with repetitive input pulses available from source 2.

The arrangement of FIG. 2, as described, can be used for several purposes, as for example in a radar transmitter, wherein power from the source 2 is desired to be coupled to a utilization circuit such as an antenna 7 and waves received by antenna 7 are desired to be coupled to a receiver or load circuit 8. Since the long slot coupler 6 has high directivity, very little of the circulating energy will enter the receiver 8 during the build-up interval. By reciprocity, since energy flows from arm A′ to arm D′, it also flows equally from arm C′ to arm B′ so long as there is no discharge along the slot. The discharge dies away quite rapidly after the stored energy which created it has been dissipated, so echo pulses entering arm C′ from the circuit 7 are freely transmitted to the receiver at arm B′. In certain applications it may be desirable to additionally employ a conventional TR switch of relatively small power capability. Because of the isolation afforded by the directivity of the long slot coupler 6, such switch can be much simpler than would otherwise be possible.

Figure 4:
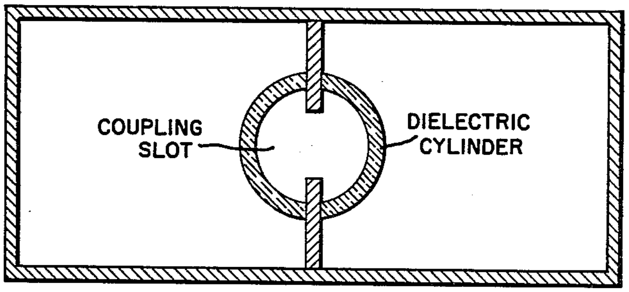
Figure 5:
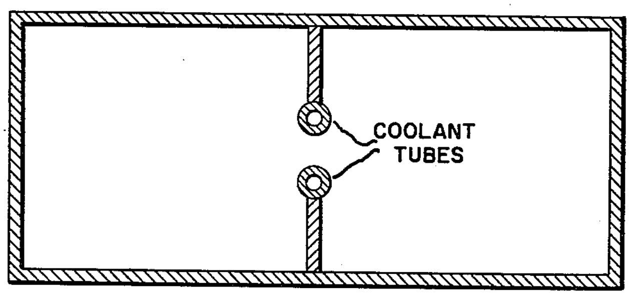

Referring to FIG. 4 there is shown a further embodiment of the long slot coupler 6 (shown in FIG. 2). In FIG. 4 a long slot is enclosed within a dielectric cylinder. The cylinder is made of a low loss ceramic envelope material. This arrangement permits control of the gas in the region of the electrical discharge as to pressure, composition and other properties which affect breakdown level, recovery time and the like. The dielectric cylinder is also useful to inhibit any tendency for the discharge to spread to other regions of the waveguide. Since appreciable quantities of heat may be generated by the electrical discharge, it may be desirable to add cooling means. This may be accomplished by adding coolant tubes in the form of hollow cylinders to the slot edges as in FIG. 5. A suitable coolant may, therefore, be circulated through these coolant tubes.

Figure 6:
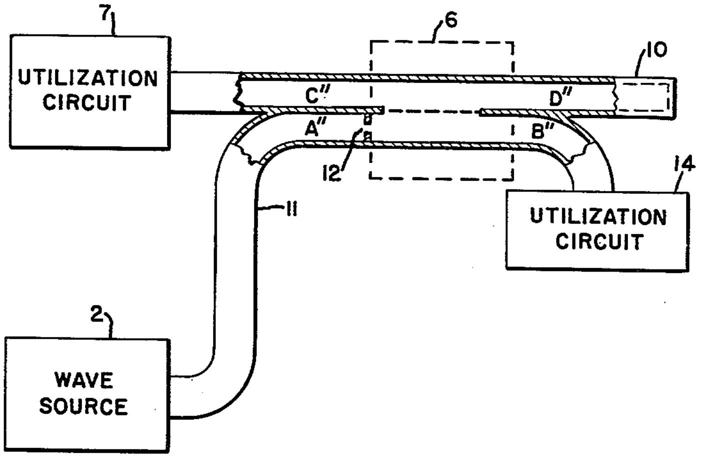
FIG. 6 illustrates an application of the present invention to a radio transmitter-receiver arrangement.

Another version of the basic pulse conversion device, in which energy is stored in a standing wave rather than in a traveling wave, is shown in FIG. 6. Two waveguides 10 and 11 are coupled by means of a 100% directional coupler 6, e.g., of the long slot type previously shown in FIG. 3. The input arm A″ is coupled to the remainder of the circuit by means of a coupling iris 12. So long as the slot of the directional coupler is not closed by an electrical discharge, all energy passing through the iris will enter arm D″ and be reflected by the closed end 13 of the waveguide. The reflected wave will follow the same path back to the iris where a portion will again be reflected. If the length of the secondary waveguide and the input frequency are properly selected, a standing wave resonance condition will exist and the energy level in the circuit to the right of the iris will increase to many times the input energy level. The ratio of these two energy levels is determined by the loaded Q of the resonant cavity formed by the circuit. When the secondary energy level is high enough to produce a discharge across the slot gap of the 100% directional coupler, the stored energy will be directed into the load circuit of arm C″. Since a standing wave is composed of two oppositely directed traveling waves, the leftward-directed wave will go directly into the load 7; the rightward-directed wave will be reflected at the closed end of the waveguide and thus become a leftward-directed wave which will also pass to the load 7. The pulse length of radio frequency energy entering the load is thus given by $$\tau=\frac{2L}{v_g}$$

where $\tau$ is the pulse length, L is the effective length of the cavity and $v_g$ is the group velocity for wave transmission. As compared with the circuit of FIG. 2, for a given length of waveguide, L the circuit of FIG. 6 will produce a pulse twice as long. The reciprocal nature of the coupling device insures that the circuit is self-duplexing in the same manner as described in connection with FIG. 2, i.e., reflected wave energy entering arm C'' will be directed into the utilization circuit 14, as for example a receiver, associated with arm B'' after the electrical discharge has disappeared.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are, therefore, intended to cover and embrace any such modifications within the limits of the true spirit and scope of the invention.

What I claim and desire to secure by Letters Patent of the United States is:

1. In combination, a first waveguide section and a second waveguide section electrically coupled by a directional coupler, a source of electromagnetic waves coupled to one end of said first waveguide section, a first non-reflecting load coupled to the other end of said first waveguide section, said second waveguide section having overlapping end portions with a common side wall, a total coupler in said common side wall providing a closed loop wave energy path in said second waveguide section of an integral number of wavelengths at the frequency of waves from said source, whereby waves coupled into the loop by said directional coupler propagate around said loop as traveling waves, the transmission coefficient of said loop and the coupling coefficient of said directional coupler being proportioned so that the power level of waves propagating in said loop is greater than the power level of waves of said source, a utilization circuit and a second non-reflecting load coupled to opposite ends of said second waveguide section, said total coupler being constructed to ionize at a predetermined value of power level in said loop so as to block wave energy transmission through said closed loop and divert said energy to the utilization circuit.

2. In combination, a source of electromagnetic waves, a first non-reflecting load, a first waveguide connecting said source to said load, a second waveguide comprising a first end portion, a center portion, and a second end portion, a directional coupler, said center portion being coupled to said first waveguide by said directional coupler, said first and second end portions arranged so as to overlap in a contiguous relationship, a total coupler coupling said first and second end portions so as to form a closed loop wave energy path being an integral number of wavelengths long at the frequency of waves from said source, whereby waves coupled into the loop by said directional coupler propagate around said loop as traveling waves, the transmission coefficient of said loop and the coupling coefficient of said directional coupler being proportioned so that the power level of waves propagating in said loop is greater than the power level of waves of said source, a utilization circuit being coupled to the end of said first end portion, a second non-reflecting load being coupled to the end of said second portion, said total coupler being constructed to block wave energy transmission between said first and second end portions and divert said energy to the utilization circuit in response to a predetermined valve of power level in said loop.

3. In combination, a source of electromagnetic waves, a first non-reflecting load, a first waveguide connecting said source to said load, a second waveguide comprising a first end portion, a center portion, and a second end portion, a directional coupler, said center portion having a side wall contiguous to a side wall of said first waveguide and coupled thereto by said directional coupler, said first and second end portions arranged so as to overlap in a contiguous relationship so as to form a common side wall, a long slot coupler in said common wall whereby said second waveguide provides a closed loop wave energy path being an integral number of wavelengths long at the frequency of waves from said source, whereby waves coupled into the loop by said directional coupler propagate around said loop as traveling waves, the transmission coefficient of said loop and the coupling coefficient of said directional coupler being proportioned so that the power level of waves propagating in said loop is greater than the power level of waves of said source, a utilization circuit being coupled to the end of said first end portion, a second non-reflecting load being coupled to the end of said second end portion, said long slot coupler being constructed to ionize at a predetermined value of power level in said loop so as to block wave energy transmission between said first and second end portions and divert said energy to the utilization circuit.

References Cited in the file of this patent

UNITED STATES PATENTS 2,930,004 Coale ---------------- Mar. 22, 1960